United States Patent [19]

White

[11] Patent Number: 5,072,635
[45] Date of Patent: Dec. 17, 1991

[54] FINISHED PART COLLECTION SYSTEM FOR AUTOMATED TURRET LATHE

[76] Inventor: Bruce White, 7077 Catalina Trail, Apple Valley, Calif. 92308

[21] Appl. No.: 480,829

[22] Filed: Feb. 16, 1990

[51] Int. Cl.⁵ .............................................. B23B 3/00
[52] U.S. Cl. ...................................... 82/124; 414/222
[58] Field of Search .................. 82/124, 120, 121, 48, 82/152, 153, 102; 29/27 R, 27 C, 57, 65, 42; 409/186; 414/749

[56] References Cited

U.S. PATENT DOCUMENTS

| | | | |
|---|---|---|---|
| 3,113,371 | 12/1963 | Spohn | 29/42 |
| 3,889,559 | 6/1975 | Scholtes | 82/124 |
| 4,183,269 | 1/1980 | Molliex | 82/124 |

FOREIGN PATENT DOCUMENTS

| | | | |
|---|---|---|---|
| 2380096 | 10/1978 | France | 82/124 |
| 0112705 | 8/1980 | Japan | 82/124 |

Primary Examiner—Larry I. Schwartz
Assistant Examiner—Kevin J. Carroll
Attorney, Agent, or Firm—Charles H. Thomas

[57] ABSTRACT

An automated turret lathe is provided with an automated finished part collection system. The parts are collected as they are produced and are not allowed to fall among chips, shavings and other debris in the turret lathe bed. As the turret head of the turret lathe is withdrawn to allow each machined portion of the work stock to be cut from the remaining raw, unmachined bar of work stock, the turret head travels along a path of withdrawal in which an actuating means is located. The actuating means triggers advancement of an elongated arm and rotation of a collection receptacle that is secured to the end of the elongated arm. The receptacle is oriented concave upward as it is brought into a position immediately beneath the machined portion of the work stock. When that portion is cut from the remaining bar of work stock as a finished part, it falls into the receptacle which then is retracted. As the elongated arm carrying the receptacle retracts, the receptacle is rotated to deposit the finished part from the receptacle into a collection bin.

12 Claims, 3 Drawing Sheets

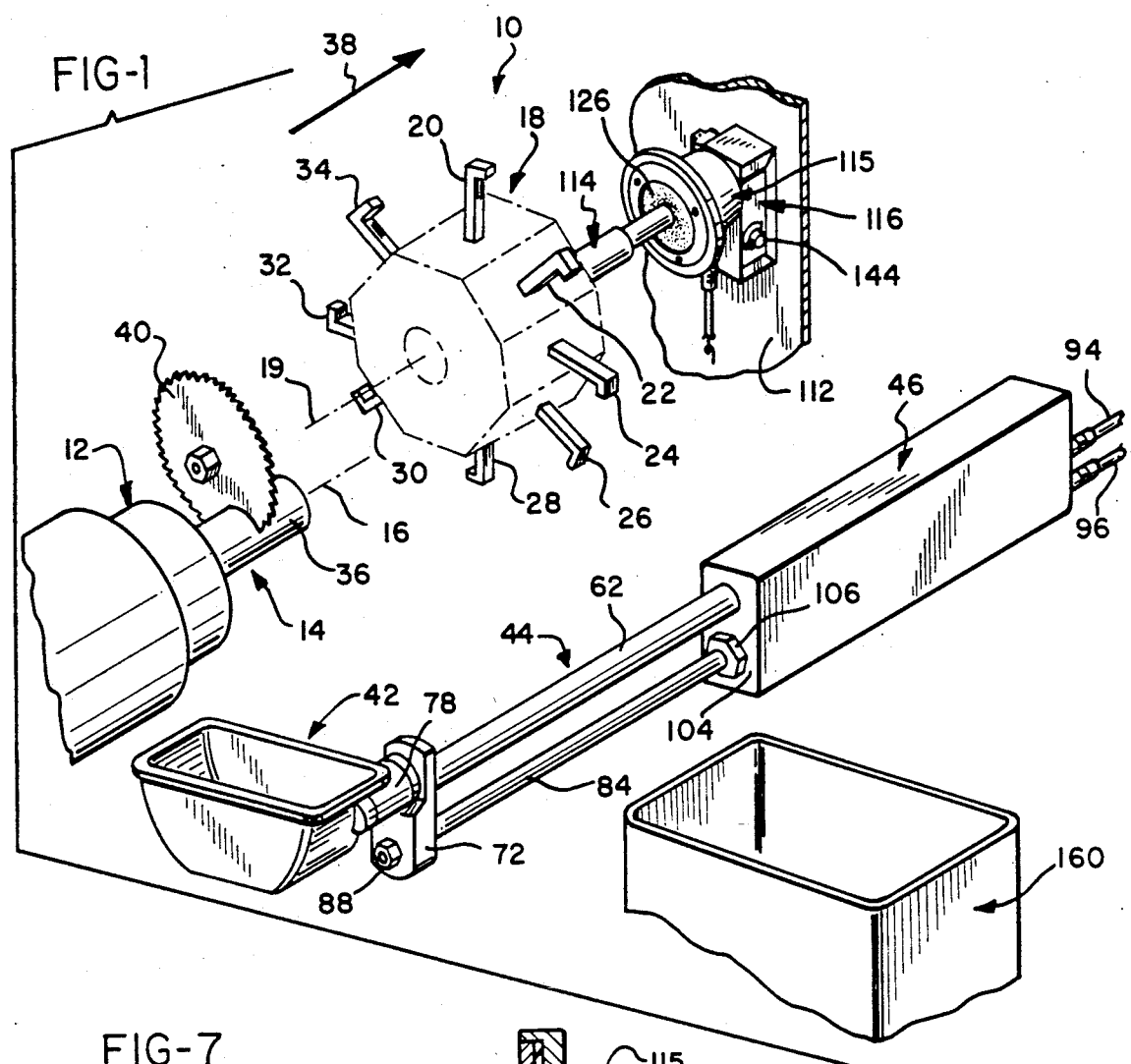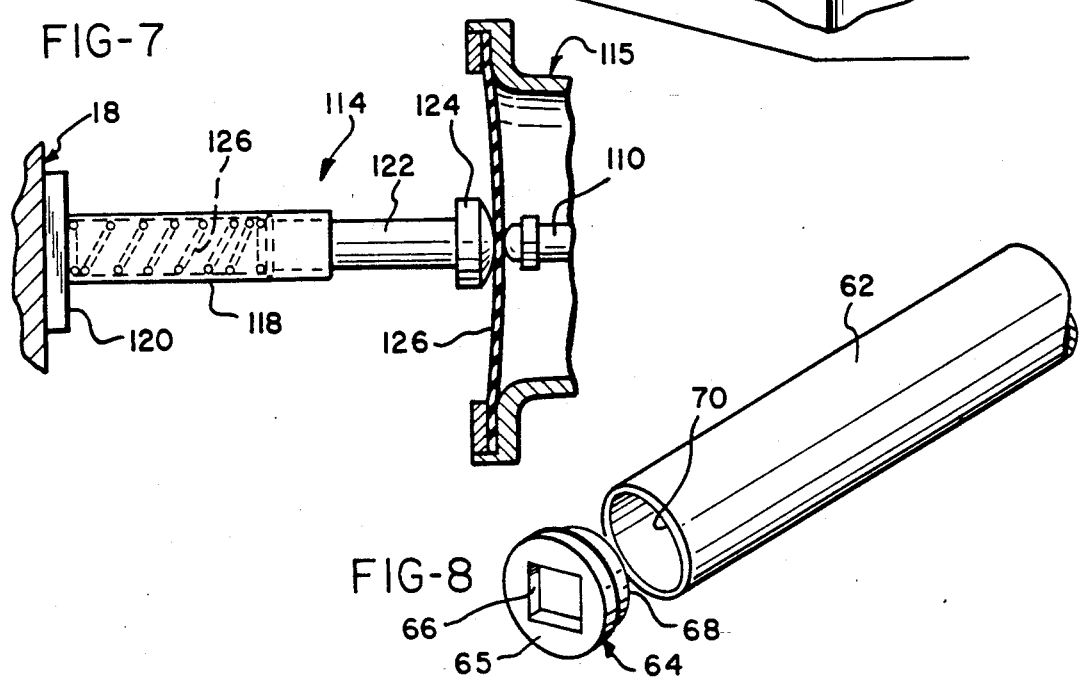

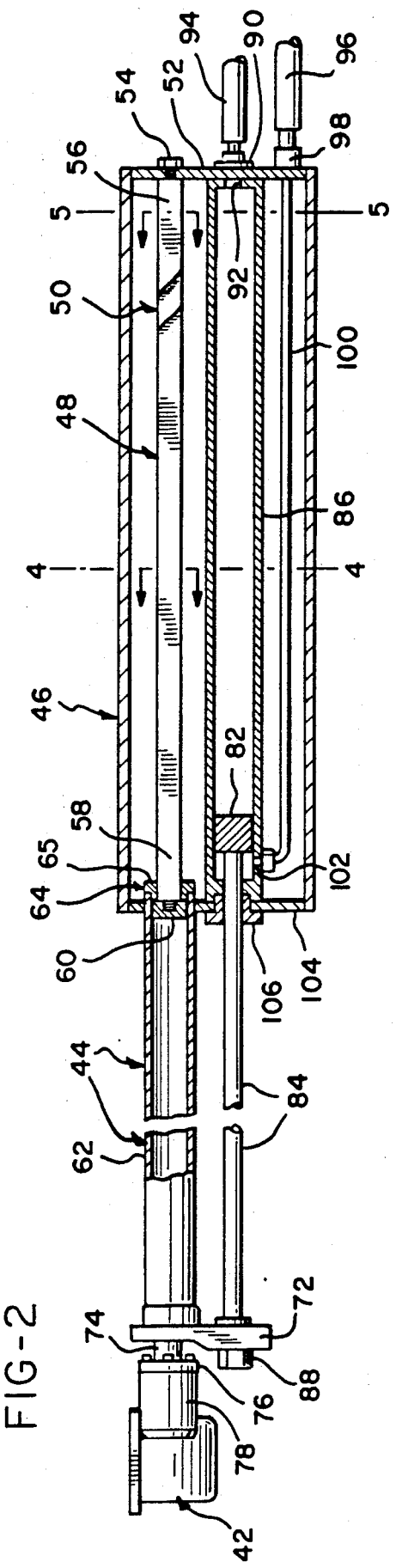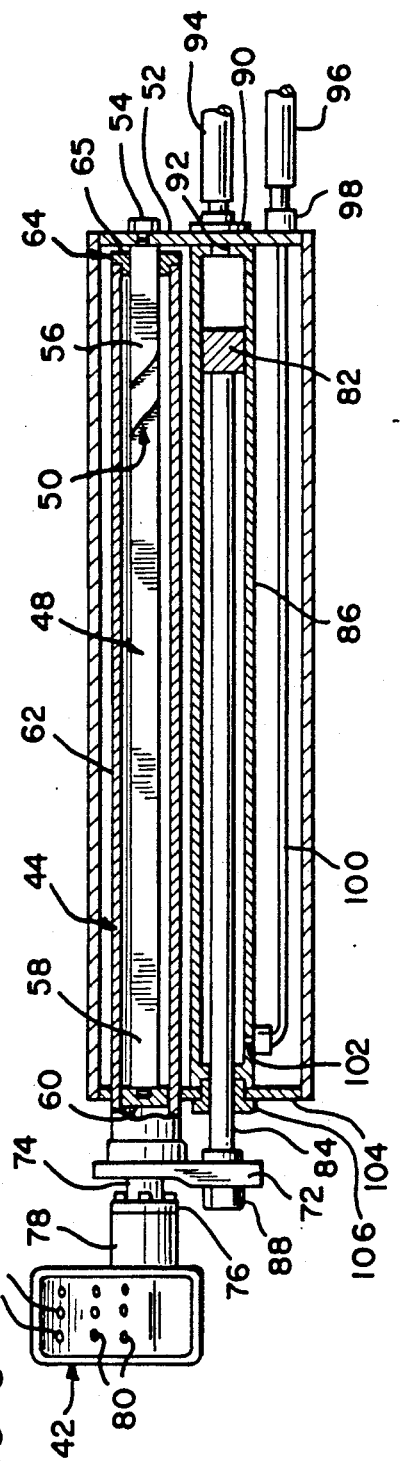

FINISHED PART COLLECTION SYSTEM FOR AUTOMATED TURRET LATHE

BACKGROUND OF THE INVENTION

1. Field of the Invention

The present invention is directed to a finished part collection system for use with an automated turret lathe.

2. Description of the Prior Art

Automated, computerized, numerically controlled turret lathes are widely used in industry to create machined parts that are useful for many diverse purposes. A conventional automated turret lathe includes an annular chuck which holds a length of work stock of uniform cross section that is advanced longitudinally from the face of the chuck into a position for machining by a turret head. A turret head is mounted for rotation about an axis parallel to the chuck axis and includes a number of implements adapted to perform specific machining operations on the portion of the bar of work stock protruding from the face of the turret lathe. Milling, reaming, boring, grinding, drilling and various other machining operations are among the machining operations which are performed by the turret head on the protruding portion of the work stock.

Each machining operation is performed by a different tool or implement which is brought into position and directed toward the protruding portion of the bar of work stock by rotation of the turret head about its own axis through a predetermined angular arc. With the completion of each machining operation the turret is advanced in rotation through another arc to bring the next machining implement into position for work on the protruding portion of the work stock.

Once all machining operations have been completed, the turret head is longitudinally withdrawn along its axis away from the chuck and away from the portion of the work stock which has been machined. A transverse saw blade is mounted for rotation about an axis parallel to both the axis of the chuck and that of the turret lathe, and is brought into position to sever the machined portion of the bar of work stock from the remaining portion of the work stock that is held gripped within the chuck. Once the machined portion has been completely severed from the remainder of the work stock, it typically falls into the bed of the turret lathe along with chips, turnings, filings, scrapings and other debris that are produced from the machining operations. The bar of work stock is then advanced longitudinally a distance equal to the longitudinal length of the next part to be machined, and the machining operations of the machine implements on the turret head, and the subsequent severance of the protruding machined portion of the bar of work stock, are repeated.

Eventually, a number of finished, machined parts will lie together in the bed of the turret lathe, along with metal scraps, metal chips and turnings which are produced during the machining operations. Ultimately enough such finished parts will drop to the floor of the turret lathe bed so that collection is warranted. A workman thereupon manually picks up the finished parts from the turret lathe bed and places these finished parts in a collection bin.

Although the actual machining operations of a conventional, automated turret lathe are highly automated and are performed under the control of a predetermined, numerically controlled program, the collection of finished parts from conventional automated turret lathe systems is not automated, but is performed completely manually. Thus, although the costs of machining the parts is reduced by automation, the collection process which is performed manually is still labor intensive, thus adding to the costs of the finished parts. Retrieval of the finished parts from the turret lathe bed is quite time consuming, as a workman must sort through the various waste debris to locate the parts and collect them.

Furthermore, some liquid, typically either oil or water, is normally sprayed onto either the machining implements or the work stock during the machining process to cool the machining implements so as to prolong their life. The liquid coats the machined portions of the work stock. Flying chips, metal turnings, metal flakes, and other debris tend to cling to the machined metal portions of the work stock in any event as the machining operations are carried out. However, the use of a liquid coolant on the work stock increases the extent to which such metallic debris clings to the machined parts.

In addition, once the metal parts drop into the bed of the turret lathe, they lie unprotected from the shower of metal flakes and chips produced from machining subsequent parts. As a consequence, the metal parts produced and collected in the bed of a turret lathe in a conventional manner carry a great deal of small metal chips and flakes with them once they are manually collected. The removal of these small metal particles is quite laborious and time consuming, thus adding significantly to the cost of producing each machined part.

SUMMARY OF THE INVENTION

The present invention provides a new and improved system by which finished parts are collected once they have been produced in an automated turret lathe. According to the invention, an automated system is provided for catching each finished part as it drops from the chuck when the machined portion of the work stock is severed from the remainder of the bar of work stock to produce each finished part. According to the invention a basket or other receptacle is mounted on an elongated, reciprocal arm. The arm is normally maintained in a retracted position so that is does not interfere with the operation of the machining implements on the turret head nor the movement of the turret head in the positioning of those implements for different machining operations. At the conclusion of all machining operations, the turret head is withdrawn along its axis away from the chuck.

According to the invention, withdrawal of the turret lathe trips a switch which initiates movement of the elongated arm carrying the finished part collection receptacle. A means is provided for cyclically moving the elongated arm in translation between an extended position in which the receptacle is held proximate to the chuck and directly beneath the finished parts dropping therefrom, and a retracted position remote from the chuck. Some means is also provided for rotating the elongated arm. That means for rotation is interconnected with the means for moving the elongated arm in translation so as to hold the finished part collection receptacle concave upward when the arm is in its extended position, and for turning the receptacle to a different orientation when the arm is moved to the retracted position Some further means is provided for operating the mechanisms that move the arm in translation and rotate the elongated arm. This is done as a function of the cyclical operation of the automated lathe.

In one broad aspect the present invention may be considered to be a finished part collection system for use with an automated turret lathe having a chuck for holding stock for machining, a turret head for performing a cyclic sequence of machining operations on the stock, and a blade for cutting a portion of the stock at the conclusion of machining by the turret head. The finished part collection system is comprised of a concave finished part collection receptacle, an extendable and retractable elongated arm mounted for reciprocation beneath the level of the chuck and carrying the receptacle at an extremity thereof, and rotating means, to which the elongated arm is coupled to move in translation relative thereto and which rotates the arm in one angular direction to a predetermined angular disposition as the arm moves to an extended position. In the extended position the receptacle is held proximate to the chuck and concave upward to receive a finished part falling vertically from the chuck. The rotating means rotates the arm to a different predetermined angular disposition as the arm moves to a retracted position. In this retracted position the receptacle is held remote from the chuck and tipped so as to drop a finished part therefrom into a finished part collection bin. Operating means is provided for cyclically extending and retracting the arm.

In another broad aspect the present invention is an improvement to an automatic turret lathe having a chuck for carrying work stock and a turret head that performs machining operations on a portion of the work stock and which has means for thereafter severing the machined portion of the work stock from the remainder of the work stock to create finished parts. The improvement is comprised of a concave finished part receptacle, an elongated arm carrying the receptacle thereon, translating means for moving the receptacle between an extended position proximate to the chuck and immediately beneath a machined portion of the stock, and a retracted position remote from the chuck. The improvement is further comprised of a rotating means operated by the translating means to rotate the receptacle from a disposition facing concave upward when the receptacle is in its extended position and a tipped position when the receptacle is withdrawn to its retracted position.

It is an object of the present invention to automatically catch each finished part as that part is sawn from the bar of work stock following machining, and to automatically deposit each such finished part into a collection bin located remote from the chuck of the turret lathe. By individually collecting each part as it is finished and as it falls from the chuck, and by transporting that part to a collection area spaced some distance from the chuck, the parts do not fall into the lathe bed along with metal chips, flakes and turnings. Therefore, the parts are collected in a much cleaner condition and are far less likely to be fouled or damaged due to the presence of metal scraps and chips.

Another object of the invention is to reduce the time and labor expense required to collect finished parts produced by an automated turret lathe. Due to the high costs of machine shop labor the cost of the collection system is recovered after only a short period of operation.

A further object of the invention is to collect each part as it is finished on a turret lathe and to transport that part to a location where it is not showered with chips and turnings that are produced from the machining of subsequent parts. The finished parts, when protected in this manner, are less likely to become fouled or damaged by the presence of machining debris.

Another important object of the invention is to complete the collection of finished parts from an automated turret lathe in a totally automated manner. The finished part collection system is activated by the withdrawal of the turret head at the termination of machining operations just prior to sawing the machined portion of the work stock from the remainder of the bar of work stock.

To this end an activating plunger is provided on the rear of the turret head. The plunger depresses an electrical switch as the turret head arrives at its position of withdrawal from the turret lathe chuck. The activating circuitry of the finished part collection system of the invention causes the elongated arm to be extended from its retracted position to its extended position, and then retracted again. The mechanism for turning the elongated arm in rotation is interconnected with the mechanism for moving the arm in translation between its extended position and retracted position, so that the angular orientation of the receptacle is dependent upon the degree of extension of the elongated arm.

A timing mechanism is provided in the finished part collection system to hold the elongated arm in its extended position for a predetermined time duration sufficient to ensure that the receptacle is in position beneath the finished part as the finished part is completely severed from the remaining work stock held in the chuck. Preferably the timing mechanism is adjustable so as to allow control of the duration of time at which the receptacle is held beneath the finished part as that part is being sawn from the remainder of the work stock.

The invention may be described with greater clarity and particularity with reference to the accompanying drawings.

DESCRIPTION OF THE DRAWINGS

FIG. 1 is a perspective view showing an otherwise conventional automated turret lathe modified by the incorporation of the finished part collection system of the invention.

FIG. 2 is a sectional elevational view of the finished part collection system of FIG. 1 with the elongated arm thereof shown in its extended position.

FIG. 5 is a sectional elevational diagrammatic detail taken along the lines 5—5 of FIG. 2.

FIG. 7 is a sectional elevational detail showing the mechanical actuating mechanism of the finished part collection system depicted in FIG. 1.

FIG. 8 is a perspective, exploded detail of the elongated arm of the finished part collection system of the invention.

DESCRIPTION OF THE EMBODIMENT

Figure 3:
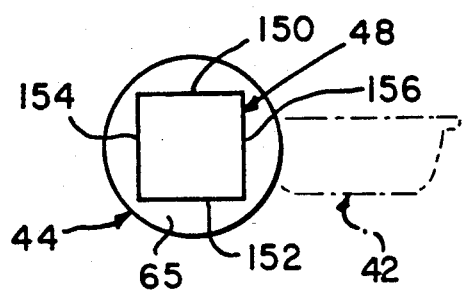
FIG. 3 illustrates the finished part collecting system of FIG. 1 showing the elongated arm in its retracted position.

FIG. 1 illustrates the relevant parts of a computerized, numerically controlled automated turret lathe 10 of conventional design. The automated turret lathe 10 is modified to include the improvement of the invention. The turret lathe 10 is equipped with a rotatable annular chuck 12 that carries a length of a bar of work stock indicated at 14. The chuck 12 holds the linear bar of work stock 14 therewithin aligned along its own horizontal axis 16. The turret lathe 10 also is equipped with a turret head 18 that is rotatable about a horizontal axis 19 lying parallel to the axis 16.

The turret head 18 has a plurality of different machining tools 20-34 that are each sequentially brought into machining engagement with a portion 36 of the length of the bar of work stock 14. The turret head 18 is rotated about its axis 19 through an angle sufficient to advance each of the machining tools 20-34 into axial or radial alignment with the portion 36 of the bar of work stock 14. The turret head 18 is controlled by a computer program to advance and withdraw longitudinally along its axis 19, as required, to sequentially bring each of the tools 20-34 into machining engagement with the protruding extremity portion 36 of the bar of work stock 14.

The tools 20-34 are operated under computer control to perform prescribed machining operations on the protruding portion 36 of the bar of work stock 14. The tools 20-34 perform operations of boring, tapping, milling, reaming, and other machine operations as required to machine a part, typically metal, into a prescribed configuration according to predetermined specifications. Once all of the required machining operations have been performed on the projecting portion 36 of the work stock 14, the turret head 18 is withdrawn rearwardly away from the chuck 12 in the direction indicated by the directional indicia 38. A saw blade 40 is then radially advanced toward the work stock 14 and is rotated while advancing to saw the projecting machined portion 36 from the remainder of the bar of work stock 14. Once the portion 36 has been sawn free from the remainder of the work stock 14, it is a completed finished part. The bar of work stock 14 is then axially advanced along the chuck axis 16 toward the turret head 18, and the process is repeated.

The automated turret lathe 10 is provided with a finished part collection system according to the invention which is comprised of a concave finished part collection receptacle 42, an extendable and retractable elongated arm 44, and a rod 48 for rotating the arm 44 as it moves relative thereto. The elongated arm 44 is mounted in a horizontal disposition for reciprocation at a level located vertically beneath the level of the chuck 12. The arm 44 carries the receptacle 42 at its outwardly projecting extremity. The retractable arm 44 is mounted for movement relative to a generally rectangular housing 46 that is held stationary relative to the chuck 12. The housing 46 may be bolted to the frame of the turret lathe 10 by any suitable mounting arrangement.

The system is provided with rotating means to which the elongated arm 44 is coupled to move in translation relative thereto. Specifically, and as illustrated in FIGS. 2-5, the rotating means may take the form of a steel rod 48 having a polygonal cross section, which is square in the embodiment depicted. The square rod 48 may, for example, be approximately twenty two inches in length and includes a twisted section 50 therein along its length. In the embodiment depicted the twisted section 50 extends over an arc of one hundred twenty degrees. The rod 48 is oriented parallel to the elongated arm 44 and also parallel to the axis 16 of the chuck 12 and is spaced laterally from a vertical plane containing the chuck axis 16 and at a distance slightly below the vertical level of the chuck axis 16.

The rod 48 of square outer cross sectional configuration is secured to a rear end wall 52 of the housing 46 by means of a bolt 54 that is engaged in a longitudinally extending tapped bore in the end 56 of the rod 50 remote from the chuck 12. The opposite end 58 of the rod 48 terminates in an axially projecting externally threaded stud to which a disk-shaped bushing 60 is attached. The bushing 60 has a cross sectional area greater than the cross sectional area of the rod 48. The bushing 60 is threadably engaged on the stud at the distal end 58 of the rod 48 and serves as a limit stop mechanism for the elongated arm 44.

The elongated arm 44 is comprised of a cylindrical, annular hollow steel tube 62. The tube 62 is closed at its end remote from the chuck 12 by means of an end guide plug 64. The end guide plug 64 is formed with a transverse end partition 65 that is oriented perpendicular to the orientation of the elongated arm 44 into which an axial opening 66 of square cross section is defined. The dimensions of the square opening 66 in the plug 64 are just slightly larger than the outer cross sectional dimensions of the rod 44 so that the plug 64 can slide along the outer surface of the rod 48, but is constrained against lateral movement relative thereto within the dimensional tolerances of the opening 66 and the outer surface of the rod 48. The cross sectional configuration of the opening 66 and that of the rod 48 thereby match.

The plug 64 is formed with a bearing ledge that defines a collar 68 of diameter reduced from the outer diameter of the plug 64 and tube 62. The collar 68 thereby seats within the cylindrical end opening 70 of the hollow tube 62. The plug 64 is immobilized relative to the tube 62 by welding or some other fastening means. The bushing 60 held on the end of the rod 48 is captured within the enclosure defined within the tube 62.

The opposite, distal end of the tube 62 resides in abutment against a transversely extending oblong nylon spacing plate 72. A plug 74 is fastened in the distal end of the tube 62 and has a neck of reduced diameter to pass through one of two circular openings in the spacing plate 72 and terminates in a mounting flange 76. The mounting flange 76, in turn, is secured to a plastic basket holder 78 by several longitudinally extending bolts that extend through openings in the mounting flange 76.

The concave basket 42 is also secured by bolts to the basket holder 78. The basket 42 is also formed of plastic and has a plurality of openings 80 in its bottom to allow oil, water or other cooling fluid to drain therefrom. The basket 42 is large enough to receive a projecting extremity 36 from the bar of work stock 14 that falls as a finished part from the remainder of the bar of work stock 14.

The system for rotating the basket 42 about the axis of the elongated arm 44 employs the action of a track follower on a track, or its equivalent. In the embodiment of the invention depicted the partition 65 of the end guide plug 64 with the polygonal opening 66 therein serves as a track follower. The rod 48 of square cross section with the twisted section 50 therein, on the other hand, serves as a longitudinally extending track, the longitudinal extremities of which are angularly offset from each other. The rod 44 is secured immobile relative to the chuck 12, while the partition 65 with the opening 66 therein is constrained to move longitudinally with the elongated arm 44.

The rod 48 is engaged in the opening 66 in the partition 65 with clearance just sufficient to allow sliding longitudinal relative movement between the rod 48 and the partition 66. The movement of the partition 65 past the twisted section 50 of the rod 48 causes relative rotation between the rod 48 and the partition 65. Since the partition 65 is rigidly locked to the cylindrical hollow tube 62 of the elongated arm 44, the entire elongated arm 44 and basket 42 are rotated relative to the twisted rod 48 as the end guide plug 64 moves along the twisted section 50.

Figure 4:
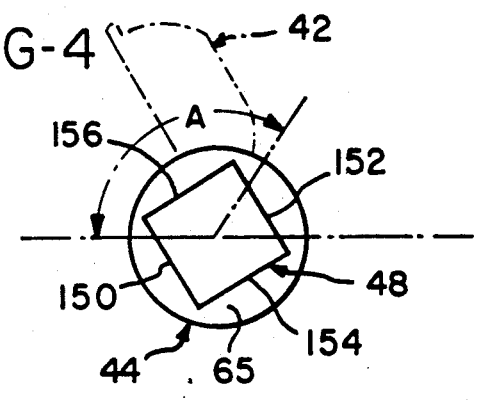
FIG. 4 is a sectional elevational diagrammatic detail taken along the lines 4—4 of FIG. 2.

As illustrated in FIGS. 2–5, the ends 56 and 58 of the rod 48 of square cross section are angularly offset from each other by at least ninety degrees, and preferably by about one hundred twenty degrees. FIG. 4 illustrates the cross section of the rod 48 taken along the lines 4—4 of FIG. 2. At this location the flat surface 150 forms the top of the rod 48, while the opposing, parallel, flat surface 152 forms the bottom of the rod 48. The mutually parallel surfaces 154 and 156 lie in separate, vertical planes and extend between the upper and lower surfaces 150 and 152.

In the twisted section 50 the surfaces 150 and 152 retain their mutually parallel orientation, but are angularly rotated about the axis of the rod 48 through an arc A of one hundred twenty degrees. The rod 48 retains its square cross section throughout its length, even within the twisted section 50. Therefore, as the partition 65 of the end guide plug 64 passes through the twisted section 50, the elongated arm 44 is rotated through an arc of one hundred twenty degrees, as is the basket 42.

The square cross section of the rod 48 matches that of the opening 66 in the guide end plug 64 and includes the twisted section 50 therein along its length. The distal end of the twisted section 50 preferably begins about eight inches from the rear end wall 52 of the casing 46. The rod 48 extends through the transverse end guide plug 64 and rotates the hollow tube 62, and indeed the entire elongated arm 44, as the end guide plug 64 passes longitudinally along the twisted section 50 of the rod 48 when the elongated arm 44 moves between the retracted and extended positions of FIGS. 3 and 2, respectively.

The elongated arm 44 serves as a translating means for moving the receptacle basket 42 in linear translation to and from an extended position proximate to the chuck 12. The elongated arm 44 is located parallel to and beneath the level of the chuck 12 so that the receptacle basket 42 is located directly beneath the portion 36 of the work stock 14 when the elongated arm 44 is in its extended position.

The plug 64, the hollow tube 62, the plug forming the neck 74, and the basket holder 78 forming the elongated arm 44 and the basket 42 are all locked together and move as a unit in both translation and rotation. The end guide plug 64, with its square opening 66 in the partition 65 thereof, and the rod 48 of square but twisted cross section serve as a means for rotating the elongated arm 44 and the basket 42. This rotating means is operated by the elongated arm 44 to rotate the receptacle basket 42 from a disposition facing concave upward, as depicted in FIGS. 1 and 2, when the receptacle basket 42 is in its extended position, and a tipped position, depicted in FIG. 3, when the receptacle basket 42 is withdrawn to its retracted position.

The finished part collection system of the invention includes means for cyclically moving the elongated arm 44 in translation between its extended position, depicted in FIG. 2, and its retracted position, depicted in FIG. 3. The function of moving the elongated arm 44 is performed by a pneumatic piston 82 mounted on an elongated piston rod 84, and a hollow, annular cylinder 86. The distal end of the piston rod 84 passes through a bushing in the second aperture in the spacing plate 72 and is secured to the spacing plate 72 by means of a bolt 88. The shank of the bolt 88 is threadably engaged in a longitudinal tapped bore in the distal end of the piston rod 84. At its opposite, proximal end the piston rod 84 carries the pneumatic piston 82 in longitudinally reciprocal fashion within the cylinder 86 for movement along an axis parallel to both the axis of the hollow tube 62 and the chuck axis 16.

One end of the cylinder 86 is secured against the back end wall 52 of the housing 46 by means of a bushing 90 having a central, axial opening therein which communicates with a pneumatic port 92. The pneumatic port 92 is in communication with a first pneumatic pressure supply line 94. A corresponding second pneumatic pressure supply line 96 terminates at a pneumatic coupling 98 that is in pneumatic communication with a connecting line 100 within the housing 46. The connecting line 100 leads to a second pneumatic port 102 through the wall of the cylinder 86 near the distal extremity thereof.

The hollow, annular cylinder 86 is stabilized relative to the distal front end wall 104 of the housing 46 by means of an annular bushing 106 that receives the piston rod 84 in sliding engagement therewithin. The bushing 66 includes an externally threaded nipple which is threadably engaged in a corresponding bore in the distal end of the cylinder 86. The spacing of the openings in the front end wall 104 of the housing 46 and in the spacing plate 72 ensure that the elongated arm 44 and the piston rod 84 are always maintained in mutually parallel alignment.

Pneumatic pressure introduced into the cylinder 86 through the port 92 by means of the first pneumatic supply line 94 exerts a force against the piston 82, driving the piston 82 and the piston rod 84 to the left to carry the elongated arm 44 to an extended position, as depicted in FIG. 2. Conversely, pneumatic pressure within the second pneumatic supply line 96 introduces air into the cylinder 86 through the port 102, thereby forcing the piston 82 to the right, and carrying the elongated arm 44 with it to withdraw the arm 44 into the housing 46 and into its retracted position, as depicted in FIG. 3.

The piston 82 and the elongated arm 44 move longitudinally and reciprocally in tandem. The hollow, annular cylinder 86 is held stationary relative to the housing 46, which in turn is held stationary relative to the chuck 12 in the embodiment depicted. It is to be understood that the system could easily be redesigned so that the cylinder would move with the elongated arm 44 and so that the piston would remain stationary relative to the chuck 12, if desired.

Figure 6:
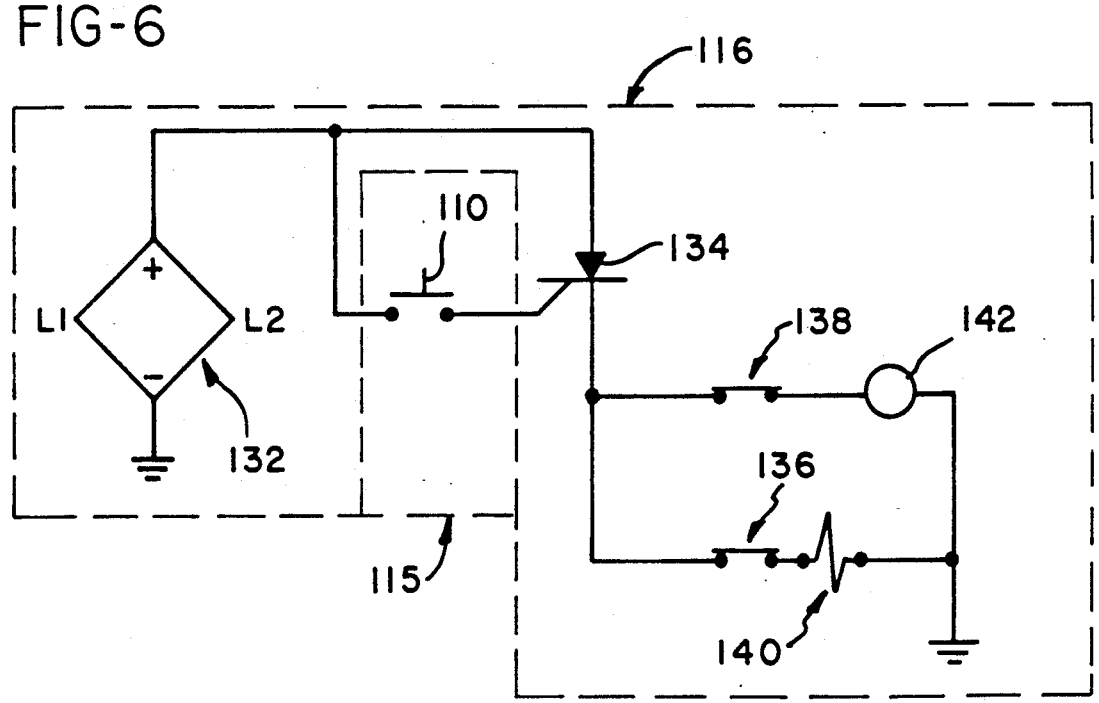
FIG. 6 is an electrical schematic diagram showing the electrical control system for the invention.

The extension and retraction of the pneumatic piston 82 and piston rod 84 is initiated by actuation of an electrical switch 110, depicted in FIGS. 6 and 7, which is secured to some support that is stationary relative to the turret lathe chuck 12. For example, the electrical switch 110 may be encased in a protective housing 115 attached to an electronic control circuit pack 116 that in turn is secured to the turret lathe frame indicated at 112 in FIG. 1. The switch 110 is actuated by means of a plunger 114 that is mounted on the back side of the turret head 18 opposite the chuck 12. Actuation of the electrical switch 110 initiates operation of the electrical enabling circuitry located within the electronic control circuit pack 116, depicted in FIG. 1.

FIG. 7 illustrates the actuating means that triggers the operating circuitry within the electronic control circuit pack 116 that in turn initiates the cyclical operation of the pneumatic piston 82 within the hollow, annular cylinder 86. The control circuitry within the electrical control pack 116 initiates a cycle whereby the piston rod 84 is expelled from the housing 46 to extend the elongated arm 44 from the casing 46, and to thereafter retract the elongated arm 44 each time the turret head 18 moves from the chuck 12 in the direction 38 to its withdrawn position. The turret head 18 cyclically moves from the chuck 12 to its withdrawn position at the conclusion of each cycle of machining on the work stock 14 from which the machined parts are produced.

The plunger 114 is constructed of plastic and is comprised of a socket section having a hollow tubular body 118 oriented in longitudinal alignment parallel to the direction of movement 38 of the turret head 18. The tubular plunger body 118 is supported from a transverse base 120 attached thereto. The socket base 120 is secured by screws to the back side of the turret head 18 opposite the chuck 12. The open end of the socket tube 118 faces away from the chuck 12 and is adapted to receive telescopically therewithin a stem 122 that has attached thereto a plunger head 124. A coil spring 126, located within the socket tube 118, urges the plunger stem 122 and plunger head 124 rearwardly away from the turret head 18, although the stem 122 is captured within the tube 118.

As the turret head 18 arrives at its rearmost position withdrawn from the chuck 12, the plunger head 124 arrives in contact with and resiliently deflects a transverse circular rubber diaphragm 126 that is stretched across the base of the switch housing 115. The diaphragm 126 shields the switch 110 from flying metal chips and other sources of contamination. The electrical switch 110 is located behind the diaphragm 126 and within the switch housing 115. The electrical switch 110 closes an electrical control circuit and initiates the cycle of extension and withdrawal of the elongated arm 44 and angular rotation of the arm 44 and the basket 42 coupled thereto.

The electrical enabling circuitry controlling the operation of the finished part collection system of the invention is depicted in FIG. 6. Power may be derived from a 120 or 240 volt alternating current source which is available in all machine shop installations. The voltage is reduced and rectified to 100 volts through any conventional direct current rectification system, indicated generally at 132 in FIG. 6. When activated by the plunger 114 the switch 110 provides a gating signal to a silicon controlled rectifier (SCR) 134, which provides a signal through normally closed sets of contacts 136 and 138.

The signal through contacts 136 energizes a pneumatic solenoid 140, which causes a forty pound per square inch pneumatic pressure supply to inject air into the first pneumatic supply line 94 leading to cylinder 86 when the elongated arm 44 is initially in the retracted position depicted in FIG. 3. The injection of air from the first air supply line 94 causes a pressure buildup in the portion of the pneumatic cylinder 86 nearest the rear end wall 52 of the housing 46 through the air inlet port 92. This pressure buildup acts against the piston 82 and advances the piston 82 to the left relative to the cylinder 86, as viewed in FIGS. 2 and 3, until the piston 82 has reached the limit of its stroke and the piston rod 84 and the elongated arm 44 are in their extended positions, as depicted in FIG. 2.

Concurrently, the signal from SCR 134 acts through normally closed contacts 138 to enable a timer 142 for the relay which controls the condition of the normally closed sets of contacts 136 and 138. Upon enablement of the timer 142 the contact sets 136 and 138 remain closed, and the elongated arm 44 remains in its extended position depicted in FIGS. 1 and 2, until the timer 142 times out.

The timer 142 is set to establish a delay in switching a four way valve coupled to a pneumatic air supply (not shown) between the first air supply line 94 and the second air supply line 96. Once the timer 142 times out, its relay opens the normally closed contacts 136 and 138. This removes the air pressure from the first air pressure supply line 94 and switches that pressure instead to the second air pressure supply line 96. Air pressure from the supply line 96 acts through pressure conduit 100 to force air through port 102 and into the portion of the pneumatic cylinder 86 near the front end wall 104 of the housing 46. This causes the piston 82 to travel from the extended position depicted in FIG. 2 to the retracted position depicted in FIG. 3.

The timer 142 includes a resistor pot which is manually adjustable by means of a rotatable dial 144 on the outside of the electrical circuit pack 116. The timer 142 is thereby adjustable by means of the dial 144 to vary the duration of the delay between actuation of the first and second air supply lines 94 and 96.

The normally closed sets of contacts 136 and 138 are opened for only a short interval. However, this time interval is sufficient to allow the elongated arm 44 to be fully retracted. Thereafter, the sets of contacts 136 and 138 return to their normally closed conditions. However, since the conduction path through the SCR 134 is momentarily broken by the opening of contacts 136 and 138, there is no longer any actuating signal through SCR 134 to the solenoid 140. The elongated arm 44 therefore remains in its retracted position depicted in FIG. 3 and is not extended again until the next closure of switch 110.

Since the turret head 18 is a heavy, massive structure, and since the electrical circuitry to be actuated by withdrawal of the turret head 18 is relatively fragile, it is advisable to provide some means for cushioning actuation of the enabling circuitry of the invention in response to movement of the turret head 18 to its withdrawn position. The plunger 114 performs this function. The relatively light spring 126 located within the plunger 114 prevents any excessive impact upon the switch 110 or the circuit pack 116 by the withdrawal of the turret head 18 from the chuck 12.

The primary components of the operating mechanism for the finished part collection system of the invention are the piston 82 with its piston rod 84 and the cylinder 86. Together these components hold the elongated arm 44 in its retracted position, as depicted in FIG. 3, until triggered by the electrical enabling circuitry of FIG. 6. The piston and cylinder combination thereupon move the elongated arm 44 in a cycle to the extended position, depicted in FIGS. 1 and 2, and return the elongated arm 44 to its retracted position once again. The timer 142 controls the duration of time during which the elongated arm 44 is held at its extended position.

In the operation of the finished part collection system of the invention the elongated arm 44 will initially reside in its retracted position depicted in FIG. 3 while the turret head 18 automatically performs machining operations on the protruding portion 36 of the work stock 14 using the tools 20-34. At the conclusion of these machining operations, the turret head 18 moves rearwardly, away from the chuck 12, as indicated by the directional arrow 38 in FIG. 1, toward its fully withdrawn position. As the turret head 18 arrives at its fully withdrawn position, the plunger head 124, depicted in FIG. 7, operates the switch element 110, which provides a gating signal to the enabling control circuitry in the circuit pack 116.

The electrical enabling circuit of FIG. 6 first actuates the first air supply line 94 to extend the elongated arm 44 from the housing 46 toward the chuck 12, and then after a predetermined delay, actuates the second air supply line 96 to withdraw the elongated arm 44 away from the chuck 12 and back into the housing 46. The timer 142 establishes the delay between actuation of the first and second air supply lines 94 and 96.

The piston rod 84 acts through the spacing plate 72 to carry the elongated arm 44 in tandem with it relative to the casing 46. As the end guide plug 64 passes over the twisted section 50 of the rod 48, it follows the square configuration of the rod 48, thereby turning the receptacle basket 42 from its tipped position, depicted in FIG. 3 and in phantom in FIG. 5, to its upwardly facing position, depicted in FIGS. 1 and 2 and in phantom in FIG. 4. Once the elongated arm 44 has been advanced to its fully extended position, the receptacle basket 42 resides vertically beneath the machined portion 36 of the work stock 14 and catches the finished part formed by that machined portion 36 once the saw blade 40 has severed the portion 36 from the remainder of the work stock 14.

Meanwhile, with the actuation of the solenoid 140 the SCR 134 concurrently actuates the timer 142. The timer 142 opens the contacts 136 and 138 only after a predetermined time interval established by the time required for the saw blade 40 to sever the machined portion 36 of the work stock 14 from the remainder of the work stock, and for the finished part formed by the machined portion 36 to fall to the receptacle basket 42. This interval can be adjusted by the knob 144 on the electrical control pack 116. Once the timer 142 times out, normally closed contacts 136 and 138 are opened. This switches the pressure in the pneumatic air supply from the first pneumatic supply line 94 to the second pneumatic supply line 96. This causes the piston rod 84 to be withdrawn back into the hollow, annular cylinder 86. The piston rod 84 carries with it the elongated arm 44 to thereby move the receptacle basket 42 rearwardly and out of the proximity of the chuck 12.

As the end guide plug 64 passes over the twisted section 50 of the rod 48, the elongated arm 44 and receptacle basket 42 are rotated one hundred twenty degrees, whereupon the receptacle basket 42 discharges the finished part formed by the machined portion 36 of work stock into a collection bin 160. The finished parts are thereby promptly and automatically withdrawn from the vicinity of the turret lathe chuck 12, and are not subjected to a deluge of chips, flakes, turnings, and other metallic debris during subsequent machining operations.

Undoubtedly, numerous variations and modifications of the invention will become readily apparent to those familiar with automated turret lathes. In one alternative arrangement For example, different mechanical elements could be substituted for the square rod and guide plug of the embodiment depicted. In one alternative arrangement a ring having a radially inwardly extending track follower could be disposed about a circular rod having a spiral track therein to provide a different type of track follower and track means for rotating the finished part receptacle 42. Also, some CNC automatic turret lathes employ a relay or some other actuating mechanism that provides a signal at the time the turret head is withdrawn from the chuck. Accordingly, this internal lathe circuitry can be connected to the operating circuitry of the electronic control circuit pack 116 to actuate the extension and retraction of the pneumatic piston 82 and piston rod 84. The electrical switch 110 would not be necessary in such a system. Accordingly, the scope of the invention should not be construed as limited to the specific embodiment depicted and described herein, but rather is defined in the claims appended hereto.

I claim:

1. A finished part collection system for use with an automated turret lathe having a chuck for holding stock for machining, a turret head for performing a cyclic sequence of machining operations on said stock, and a blade for cutting portions off said stock at the conclusion of machining by said turret head comprising:

a concave finished part collection receptacle, an extendable and retractable elongated arm mounted for reciprocation relative to said chuck and carrying said receptacle at an extremity thereof, wherein said elongated arm includes a hollow tube having an end guide with a transverse end partition located remote from said receptacle and defining a polygonal opening therein, rotating means which is coupled to said elongated arm and which rotates said arm in one angular direction to a predetermined angular disposition as said arm moves to an extended position holding said receptacle proximate to said chuck and concave upward to receive a finished part falling vertically from said chuck and which rotates said arm to a different predetermined angular disposition as said arm moves to a retracted position holding said receptacle remote from said chuck and tipped to drop a finished part therefrom into a finished part collection bin, wherein said rotating means is comprised of a rod having a polygonal cross section matching that of said opening in said end partition and said rod has a uniform cross section throughout and includes a twisted section therein along its length and said rod extends into said opening in said transverse partition and rotates said hollow tube as said end guide passes longitudinally along said twisted section of said rod when said elongated arm moves between said retracted and extended positions, and operating means for cyclically extending and retracting said arm relative to said chuck and including a piston member and a cylinder member aligned parallel to and in laterally spaced separation from said elongated arm and one of said members of said operating means is movable relative to said chuck and is coupled to said elongated arm to carry said elongated arm in tandem therewith and in reciprocation relative to the other of said members of said operating means, which remains stationary relative to said chuck.

2. A finished part collection system according to claim 1 wherein said turret head cyclically withdraws from said chuck along a predetermined path at the conclusion of each cycle of machining on said stock, and further comprising actuating means located in said path of withdrawal of said turret head for triggering said operating means to extend and retract said elongated arm each time said turret head withdraws from said chuck.

3. A finished part collection system according to claim 2 wherein said operating means is comprised of a pneumatic piston and cylinder.

4. A finished part collection system according to claim 2 wherein said operating means is comprised of means for holding said elongated arm in said retracted position unit triggered by said actuating means, whereupon it moves said elongated arm in a cycle to said extended position and returns said elongated arm to said retracted position, and further comprising a timer means for establishing a period of time during which said elongated arm is held at said extended position.

5. A finished part collection system according to claim 4 wherein said timer means has means for adjusting the duration of said period of time.

6. A finished part collection system according to claim 1 wherein said twisted section extends over an arc of about one hundred twenty degrees.

7. A finished part collection system adapted for use with a cyclically operated automated lathe having a chuck from which finished parts are dropped following machining comprising:
a concave finished part receptacle adapted to accommodate finished parts therein,
an elongated arm carrying said receptacle,
means for cyclically moving said elongated arm in translation between an extended position in which said receptacle is held proximate to said chuck and directly beneath a finished part dropping therefrom and a retracted position remote from said chuck, including a piston member and a cylinder member aligned parallel to and in laterally spaced separation form said elongated arm, and one of said members of said means for cyclically moving said elongated arm is movable relative to said chuck and is coupled to said elongated arm to carry said elongated arm in tandem therewith sand in reciprocation relative to the other of said members of said means for cyclically moving said elongated arm, which other of said members remains stationary relative to said chuck,
means for rotating said elongated arm interconnected with said means for moving said elongated arm in translation so as to hold said receptacle concave upward when said arm is in said extended position and for turning said receptacle to a different orientation when said arm is moved to said retracted position, wherein said means for rotating is comprised of an elongated rod having a polygonal outer cross section oriented parallel to said elongated arm and a transverse partition having a matching polygonal opening therethrough and oriented perpendicular to said elongated arm, and one of said rod and said partition is secured to move with said elongated arm and the other of said rod and said partition is stationary relative to said chuck, and said rod has a twisted section therein and is snugly engaged in said opening in said partition to allow sliding longitudinal relative movement therebetween, whereby relative longitudinal movement between said rod and said partition past said twisted section of said rod causes relative rotation between said rod and said partition, and
means for operating said means for moving said arm in translation and said means for rotating said elongated arm as a function of cyclic operation of said automated lathe.

8. A finished part collection system according to claim 7 wherein the ends of said polygonal rod are angularly offset from each other by at least ninety degrees.

9. A finished part collection system according to claim 7 wherein said means for cyclically moving said elongated arm in translation is comprised of a pneumatic piston and cylinder, one of which moves longitudinally with said elongated arm and the other of which is held stationary relative to said chuck.

10. A finished part collection system according to claim 9 wherein said means for operating is comprised of a first air supply for advancing said piston relative to said cylinder, a second air supply for retracting said piston relative to said cylinder, and electrical circuit means for first actuating said first air supply to extend said elongated arm toward said chuck, and thereafter actuating said second air supply to withdraw said elongated arm away from said chuck, and timer means for establishing a delay between actuation of said first and second air supplies.

11. A finished part collection system according to claim 10 wherein said timer means is adjustable to vary duration of said delay between actuation of said first and second air supplies.

12. An automatic turret lathe having a chuck carrying work stock and a turret head that performs machining operations on a portion of said work stock and means for thereafter severing said portion of said work stock to create finished parts, the improvement comprising:
a concave finished part receptacle,
an elongated arm carrying said receptacle thereon
translating means for moving said receptacle between an extended position proximate to said chuck and directly beneath said portion of said work stock and a retracted position remote form said chuck, and
rotating means operated by said translating means to rotate siad receptacle from a disposition facing concave upward when said receptacle is in its extended position and a tipped disposition when said receptacle is withdrawn to its retracted position.

* * * * *